United States Patent
Inomata

(10) Patent No.: US 9,599,815 B2
(45) Date of Patent: Mar. 21, 2017

(54) HEAD-UP DISPLAY DEVICE

(71) Applicant: DENSO CORPORATION, Kariya, Aichi-pref. (JP)

(72) Inventor: Makoto Inomata, Handa (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 17 days.

(21) Appl. No.: 14/425,464

(22) PCT Filed: Aug. 8, 2013

(86) PCT No.: PCT/JP2013/004800
§ 371 (c)(1),
(2) Date: Mar. 3, 2015

(87) PCT Pub. No.: WO2014/038131
PCT Pub. Date: Mar. 13, 2014

(65) Prior Publication Data
US 2015/0234185 A1     Aug. 20, 2015

(30) Foreign Application Priority Data

Sep. 4, 2012   (JP) .................................. 2012-194084

(51) Int. Cl.
*G02B 27/01*   (2006.01)
*G02B 5/02*    (2006.01)

(52) U.S. Cl.
CPC ....... *G02B 27/0101* (2013.01); *G02B 5/0247* (2013.01); *G02B 5/0294* (2013.01);
(Continued)

(58) Field of Classification Search
CPC ...... G02B 2027/0118; G02B 2027/012; G02B 2027/0121; G02B 2027/0129; G02B 5/02–5/0294
(Continued)

(56) References Cited

U.S. PATENT DOCUMENTS 4,416,512 A * 11/1983 Sinclair ................ G02B 17/004
359/365
5,883,606 A *  3/1999 Smoot .................. G02B 27/017
345/7
(Continued)

FOREIGN PATENT DOCUMENTS

JP    H02242218 A    9/1990
JP    H06109906 A    4/1994
(Continued)

OTHER PUBLICATIONS

International Search Report and Written Opinion (in Japanese with English Translation) for PCT/JP2013/004800, mailed Sep. 10, 2013; ISA/JP.

*Primary Examiner* — Pascal M Bui-Pho
*Assistant Examiner* — Alberto Betancourt
(74) *Attorney, Agent, or Firm* — Harness, Dickey & Pierce, P.L.C.

(57) ABSTRACT

Provided is a head-up display apparatus that projects a display image, which is formed on a display surface, onto a projection surface of a movable body to display a virtual image viewable from a cabin of the movable body. The head-up display apparatus includes a display with pixels arranged along the display surface, a light source, and a diffusion plate for diffusing the light coming from the light source and emits the diffused light toward the display. The diffusion plate has through-holes in a thickness direction. In a specific direction on the display surface, an inner dimension of the through-hole is smaller than a pixel pitch of the pixels.

9 Claims, 8 Drawing Sheets

(52) U.S. Cl.
CPC ............ *G02B 27/01* (2013.01); *G02B 27/017* (2013.01); *G02B 27/0172* (2013.01); *G02B 2027/0112* (2013.01); *G02B 2027/0118* (2013.01)

(58) Field of Classification Search
USPC .............. 359/13, 629–633, 599, 707; 345/7; 353/11–12, 20–37, 71
See application file for complete search history.

(56) References Cited

U.S. PATENT DOCUMENTS

| | | | | |
|---|---|---|---|---|
| 6,113,251 A | * | 9/2000 | Miyata | G03B 21/625 359/456 |
| 2003/0123150 A1 | * | 7/2003 | Brickey | G02B 5/0247 359/599 |
| 2008/0284942 A1 | * | 11/2008 | Mahama | G02B 6/0073 359/599 |
| 2011/0075434 A1 | | 3/2011 | Kurokawa | |
| 2012/0099032 A1 | | 4/2012 | Ishikawa | |
| 2012/0170130 A1 | * | 7/2012 | Sasaki | B60K 35/00 359/630 |

FOREIGN PATENT DOCUMENTS

| | | |
|---|---|---|
| JP | H07239446 A | 9/1995 |
| JP | H08094810 A | 4/1996 |
| JP | 2002289018 A | 10/2002 |
| JP | 2010010840 A | 1/2010 |
| JP | 2011008012 A | 1/2011 |
| JP | 2011076832 A | 4/2011 |
| JP | 2011085700 A | 4/2011 |
| JP | 2012013755 A | 1/2012 |
| JP | 2012093506 A | 5/2012 |

* cited by examiner

HEAD-UP DISPLAY DEVICE

CROSS-REFERENCES TO RELATED APPLICATIONS

This application is a U.S. National Phase Application under 35 U.S.C. 371 of International Application No. PCT/JP2013/004800 filed on Aug. 8, 2013 and published in Japanese as WO 2014/038131 A1 on Mar. 13, 2014. This application is based on and claims the benefit of priority from Japanese Patent Application No. 2012-194084 filed on Sep. 4, 2012. The entire disclosures of all of the above applications are incorporated herein by reference.

TECHNICAL FIELD

The present disclosure relates to a head-up display apparatus that projects a display image, which is formed on a display surface, onto a projection surface of a movable body to display a virtual image viewable from an inside of a cabin of the movable body.

BACKGROUND ART

A conventional head-up display apparatus includes a diffusion plate for diffusing the light emitted from a light source. This diffusion plate emits the diffused light towards a display forming a display image. A Schaukasten as disclosed in Patent Document 1 is known as one kind of such diffusion plates. For diffusing the light, this Schaukasten is formed with a porous layer with coarse pore openings as an applied film.

PRIOR ART LITERATURES

Patent Literature

Patent Literature 1: JP H07-239446A

SUMMARY OF INVENTION

In recent years, it is required that the head-up display apparatus increase the brightness of a virtual image. In order to improve a light transmittance of a diffusion plate, the inventor of the present application have found out a structure in which the diffusion plate is not formed with a porous layer with pore openings but formed with multiple through-holes that transmit the light therethrough.

However, if through-holes are simply formed in the diffusion plate, soma parts of the display image may be brightly illuminated with the light transmitting the through-holes. In this case, bright regions also locally appear in the virtual image of the display image. These bright regions may be recognized as brightness unevenness by a user.

The present disclosure is made in view of the above-mentioned problem. It is an object of the present disclosure to provide a head-up display apparatus that can display a brightness-unevenness-reduced virtual image with high brightness.

A head-up display apparatus according to a first example of the present disclosure projects a display image, which is formed on a display surface, onto a projection surface of a movable body to display a virtual image viewable from an inside of a cabin of the movable body. The head-up display apparatus comprises: a display that includes a plurality of pixels arranged along the display surface and controls the pixels to form the display image on the display surface; a light source that radiates light; and a diffusion plate that diffuses the light coming from the light source and emits the diffused light toward the display. The diffusion plate has a plurality of through-holes that penetrate the diffusion plate in a thickness direction of the diffusion plate. In a specific direction on the display surface, an inner dimension of the through-hole is smaller than a pixel pitch of the pixels.

A head-up display apparatus according to a second example of the present disclosure projects a display image, which is formed on a display surface, onto a projection surface of a movable body to display a virtual image viewable from an inside of a cabin of the movable body. The head-up display apparatus comprises: a display that forms the display image on the display surface; a light surface that radiates light; and a diffusion plate that diffuses the light coming from the light source and emits the diffused light toward the display; and a magnifier optical system that magnifies the display image formed on the display surface and projects the magnified display image onto the projection surface. The diffusion plate has a plurality of through-holes that penetrate the diffusion plate in a thickness direction of the diffusion plate. A product of an inner dimension of the through hole in a specific direction on the display surface multiplied by a magnification ratio of the display image in the specific direction is less than or equal to 0.5 millimeters, the magnification ratio being provided by the magnifier optical system and the projection surface.

In the head-up display apparatus of the first example, sizes the pixels arranged along the display surface are determined, so that the pixels displayed as components of the virtual image are hardly perceived by a user viewing the virtual image. To do so, in the head-up display apparatus, the inner dimension of the through-hole is smaller than the pixel pitch of the pixels corresponding to the size of each pixel. Therefore, the user hardly perceives the bright spots, which are produced by the light passing through the through-holes of the diffusion plate. It becomes thus possible to suppress the brightness unevenness in the virtual image.

The inventor of the present application focuses on the following; the light spot smaller than 0.5 mm or less is hardly perceived by a user. In view of this, in the head-up display apparatus of the second example, the product of the inner dimension of the through hole multiplied by the magnification ratio provided by the magnifier optical system and the projection surface is less than or equal to 0.5 millimeter. In this configuration, the bright spots produced by the light passing through the through-holes of the diffusion plate are 0.5 millimeter or less in size even when the bright spots are magnified by the magnifier optical system and the projection surface. Because the bright spots produced in the virtual image become hardly perceived by a user, it becomes possible to suppress the brightness unevenness in the virtual image.

In addition, in the head-up display apparatus of the first and second examples, because the light radiated from the light source can pass through the through holes, the light transmittance of the diffusion plate can easily improve. Therefore, the head-up display apparatus can display the virtual image with high-brightness and reduced-brightness-unevenness.

BRIEF DESCRIPTION OF DRAWINGS

The above and other objects, features, and advantages of the present disclosure will become more apparent from the below description made with reference to the accompanying drawings. In the attached drawings.

EMBODIMENTS FOR CARRYING OUT INVENTION

Multiple embodiments of the present disclosure will be described below based on the drawings. In embodiments, like references are used to refer to corresponding elements and a redundant description may be omitted. If only a part of a structure is described in one embodiment, other parts of the structure may refer to the structure of the aforementioned embodiment. Additionally, not only combinations of structures explicitly described in embodiments but also not-explicitly described combinations of structures are possible as long as they have no particular confliction.

(First Embodiment)

Figure 1:
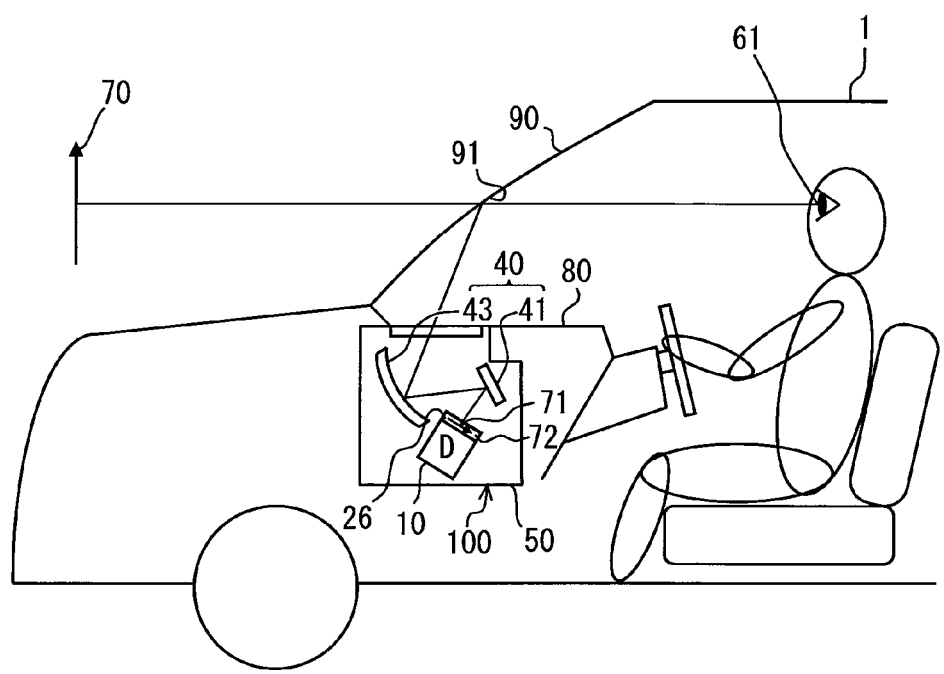
FIG. 1 is a diagram illustrating an arrangement of a head-up display apparatus in a vehicle according to a first embodiment.

As shown in FIG. 1, a head-up display (called HUD hereinafter) apparatus 100 of a first embodiment of the present disclosure is mounted in a vehicle 1 corresponding to a movable body and is accommodated in an instrument panel 80. The HUD apparatus 100 projects a display image 71, which is formed on a display surface 72, onto a windshield 90 of the vehicle 1.

In the vehicle 1, a cabin-side surface of the windshield 90 defines a projection surface 91 onto which the display image 71 is projected. The projection surface 91 is curved and concave, or flat and planar etc. The windshield 90 may have an angle difference between its cabin-side surface and outside-surface to reduce an optical path difference. Alternatively, in order to reduce the optical path difference, a vapor-deposited film layer, a film or the like may be provided on the cabin-side surface of the windshield 90.

When the light of the display image 71 is projected onto the projection surface 91 of the windshield 90, the light reflected by the projection surface 91 reaches a user's eye point 61. By recognizing the light reaching the eye point 61, the user views a virtual image 70 of the display image 70, which appears to be ahead of the windshield 90. The user can view the above virtual image 70 only when the eye point 61 is located inside a viewable region 60 of the user illustrated in FIG. 2. In other words, when the eye point 61 is out of the viewable region 60, it is difficult for the user to view the virtual image 70.

Figure 3:
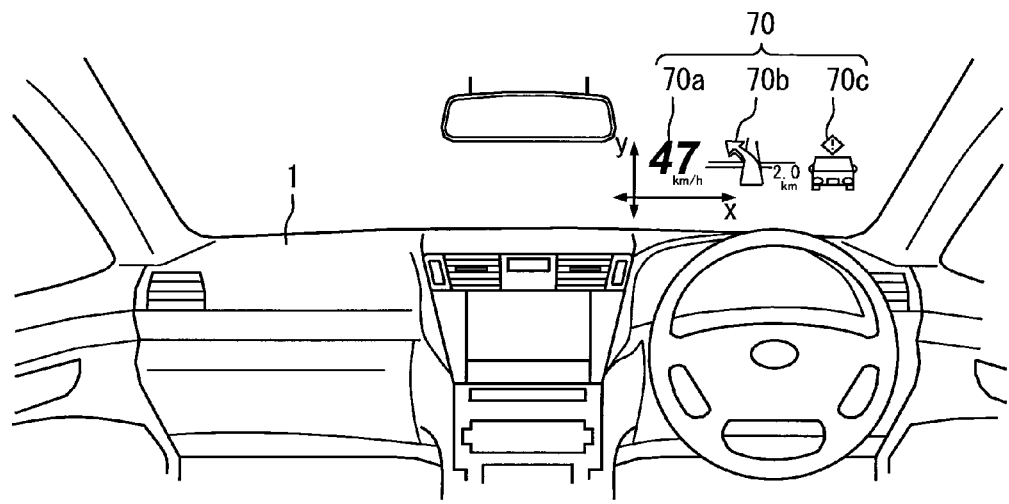
FIG. 3 is a diagram illustrating a virtual image viewably displayed by a head-up display apparatus.

The HUD apparatus 100 projects the display image 71 onto the projection surface 91, so that the virtual image 70 of the display image 71 is viewable from an inside of the cabin of the vehicle 1, as shown in FIG. 3. The virtual image 70 displayed includes, for example, a speed display 70a indicating a travel speed of the vehicle 1, an instruction display 70b instructing a travel direction of the vehicle 1 by a navigation system, and a warning display 70c relating to the vehicle 1.

A basic configuration of the HUD apparatus 100 of FIG. 1 for implementing a display function of the virtual image 70 will be described in detail below. The HUD apparatus 100 includes a display unit 10 and a magnifier optical system 40, which are in a housing 50.

Figure 4:
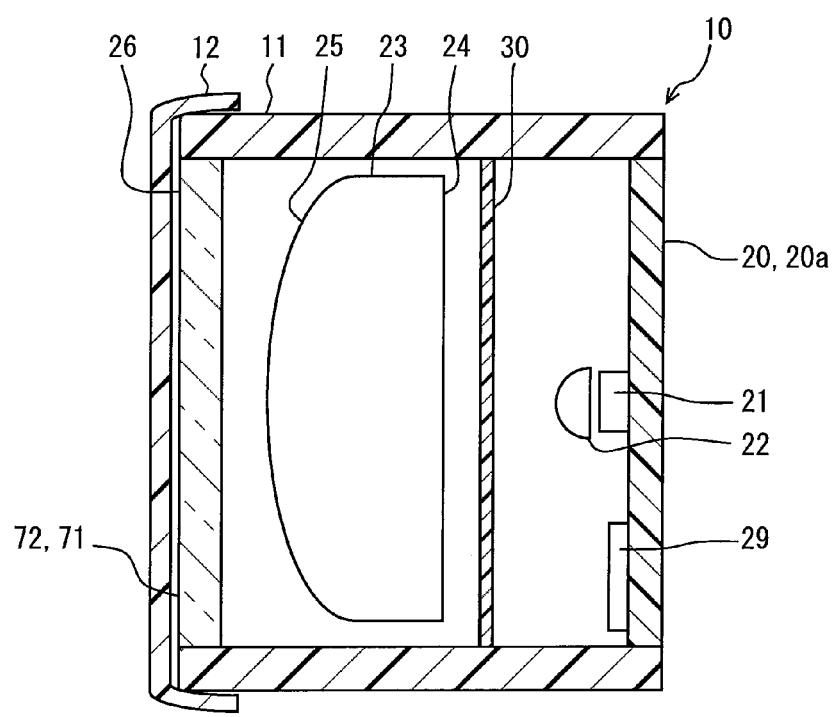
FIG. 4 is a sectional view illustrating a configuration of a display unit.

As shown in FIG. 4, the display unit 10 includes a circuit assembly 20, a diffusion plate 30, and a collimate lens 23, which are accommodated in a case 11. The display unit 10 further includes a display 26. The case 11 is covered with a cover 12 which is made of a transparent material and which serves as a lid.

In the circuit assembly 20, a controller 29 and multiple light sources 21 and the like are mounted on a circuit board 20a. The circuit board 20a is fastened to the case 11. Thereby the circuit assembly 20 is held in the case 11.

The controller 29 includes a control circuit with a processor etc. The controller 29 outputs a control signal to the display 26 to form the display image 71 on the display 26. Additionally, the controller 29 outputs driving signals to respective light sources 21 to control the light radiation of the light sources 21.

The light source 21 includes a light-emitting diode, which emits the light by voltage application. For example, the light source 21 radiates white light toward the display 26. Each light source 21 is equipped with a light-source lens 22. By the light-source lens 22, traveling directions of the light radiated from the light source 21 are turned into a direction to the diffusion plate 30.

The diffusion plate 30 has a rectangular-plate shape and has a plate thickness of 0.1 millimeters (mm). The diffusion plate 30 is arranged between the light source 21 and the collimate lens 23. The diffusion plate 30 is held in the case 11 so that the diffusion plate 30 is parallel to the circuit board 20a. The diffusion plate 30 diffuses the light coming from the light source 21, and emits the diffused light towards the collimate lens 23 and the display 26.

The collimate lens 23 is arranged between the display 26 and the diffusion plate 30, and is held by the case 11 or the like. The collimate lens 23 has an incident surface 24, which faces the diffusion plate 30, and an emission surface 25, which faces the display 26. The incident surface 24 is smooth and flat so as to be parallel to the diffusion plate 30. The emission surface 25 is curved and convex so that a distance to the incident surface 24 is smaller at the edges than the middle. An optical axis of the collimate lens 23 is substantially perpendicular to the display 26 and the diffusion plate 30. Because of this positional arrangement of the collimate lens 23, the light incident on the incident surface 24 is refracted and emitted from the emission surface 25 in the optical axis direction.

Figure 5:
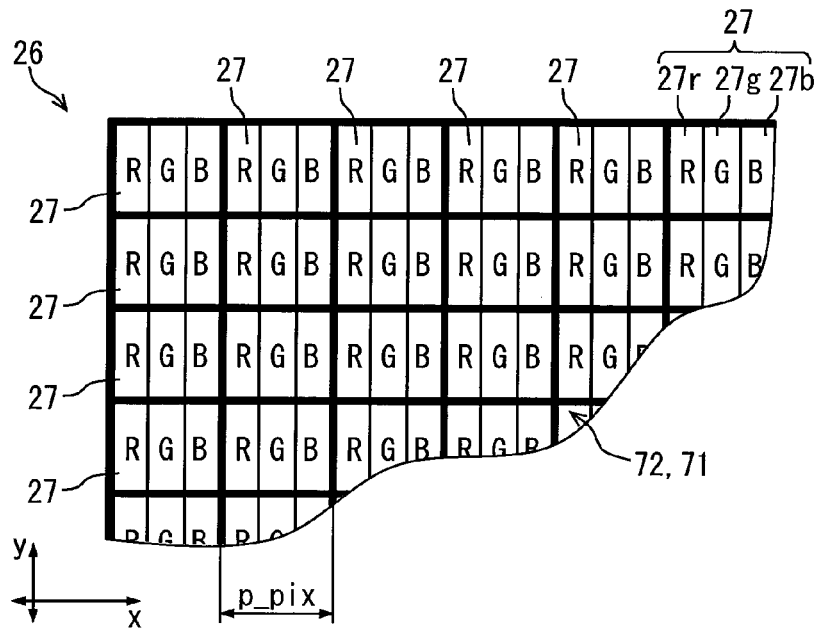
FIG. 5 is a diagram schematically illustrating pixels arranged on a display surface of a display.

The display 26 includes a transmission type liquid display panel having a rectangular plate shape. The display 26 is arranged on an opposite side of the collimate lens 23 from the diffusion plate 30 and is held by the case 11. The display 26 has the display surface 72, on which the display image 71 is formed. As shown in FIG. 5, the display 26 includes multiple pixels 27 arranged on the display surface 72. In order for color display of the display image 71 on the display surface 72, each pixel 27 includes three sub-pixels 27r, 27g, 27b, which transmit red light (R) and green light (G) and blue light (B), respectively.

As shown in FIGS. 4 and 5, the display 26 controls transmission of RGB light in each pixel 27 based on a control signal acquired from the controller 29. Thereby, the display image 71 is formed on the display surface 72. The light traveling through the display 26 passes the cover 12 and is emitted towards the magnifier optical system 40 illustrated in FIGS. 1 and 2.

The magnifier optical system 40 includes a structure for magnifying the display image 71 formed in the display surface 72, and for projecting it onto the projection surface 91. Specifically, the magnifier optical system 40 includes a plane mirror 41 and a concave mirror 43. Each of the plane mirror 41 and the concave mirror 43 is formed by vapor deposition of aluminum or the like on a surface of a base material such as glass or the like to form a reflective surface on the surface of the base material. The plane mirror 41 has a rectangular plate shape. The plane mirror 41 is held in the housing 50 so that the reflective surface of the plane mirror 41 faces toward the display 26 and the concave mirror 43. The reflective surface of the concave mirror 43 is concave so that the middle of the reflective surface is distant from the plane mirror 41 than the edges of the reflective surface are. The concave mirror 43 is held in the housing 50 so that the reflective surface of the concave mirror 43 faces toward the plane mirror 41 and the projection surface 91. In the first embodiment, the display image 71 formed on the display surface 72 is magnified six times in a horizontal direction x and a perpendicular direction y due to the magnifier optical system 40 and the curve of the projection surface 91 and the magnified image is displayed as the virtual image 70, as shown in FIG. 3.

Next, the diffusion plate 30 used in the first embodiment will be described in details, based on FIGS. 6 to 9.

Figure 6:
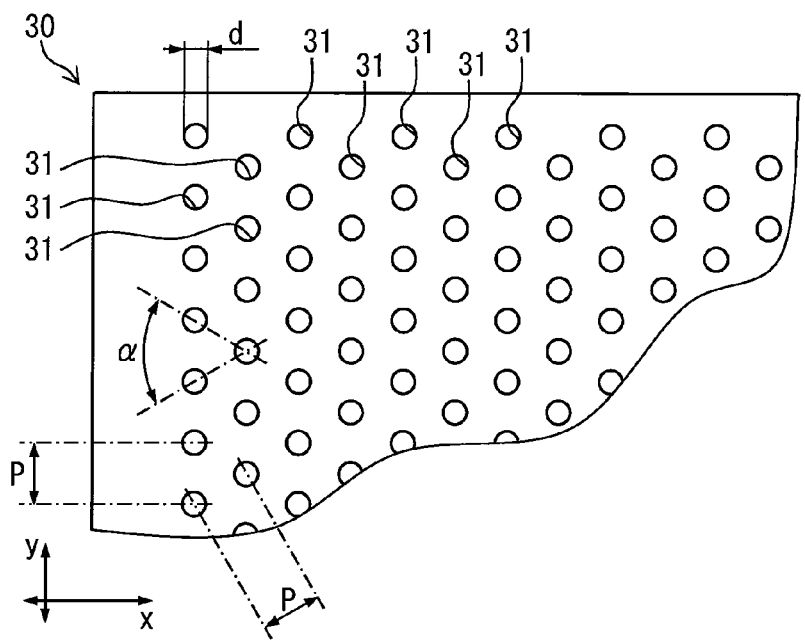
FIG. 6 is a diagram schematically illustrating through-holes formed in a diffusion plate of a first embodiment.

The diffusion plate 30 illustrated in FIG. 6 is made of a transparent resin material such as polyester resin or the like. A beads coating layer having tiny depressions and protrusions for diffusing light is formed on a surface of the diffusion plate 30. Multiple through-holes 31 penetrating the diffusion plate 30 in a thickness direction of the diffusion plate 30 are formed in the diffusion plate 30. The through-holes 31 may be formed by drilling, for example, by sticking tiny pins through the diffusion plate 30. These multiples through-hole 31 are arranged zigzag on the diffusion plate 30. Specifically, in the zigzag arrangement, the through-holes 31 adjacent in the horizontal direction x are displaced each other in the perpendicular direction y. In other words, a through-hole 31 adjacent to a certain through-hole 31 is displaced in the perpendicular direction y with respect to the certain through-hole 31. An interval P between the adjacent through-holes 31 is, for example, specified as about 0.15 mm. An angle a of a pair of through-holes 31 adjacent in the perpendicular direction y with respect to a through-hole 31 adjacent to the pair in the horizontal direction x is, for example, specified as 60 degrees.

Each through-hole 31 has a cylindrical hole shape. Because of this, a cross sectional shape of the through-hole 31 taken along a plane perpendicular to the thickness direction of the diffusion plate 30 is substantially circular. A diameter d of the through-hole 31, which is an inner dimension of the through-hole 31, is about $\phi$ 50 micrometers ($\mu$m). The diameter d of the through-hole 31 is constant in the thickness direction. An axis direction of the through-hole 31 is parallel to the thickness direction of the diffusion plate 30.

All the light incident on the through holes 31 from the light source 21 passes through the diffusion plate 30 and travels toward the display 26. About 60% of the light incident on diffusion regions 33, which surround the through-holes 31, passes through the diffusion plate 30 while diffusing in the diffusion plate 30 and travels towards the display 26.

A design principle of the through-hole 31 will be more specifically described.

Figure 7:
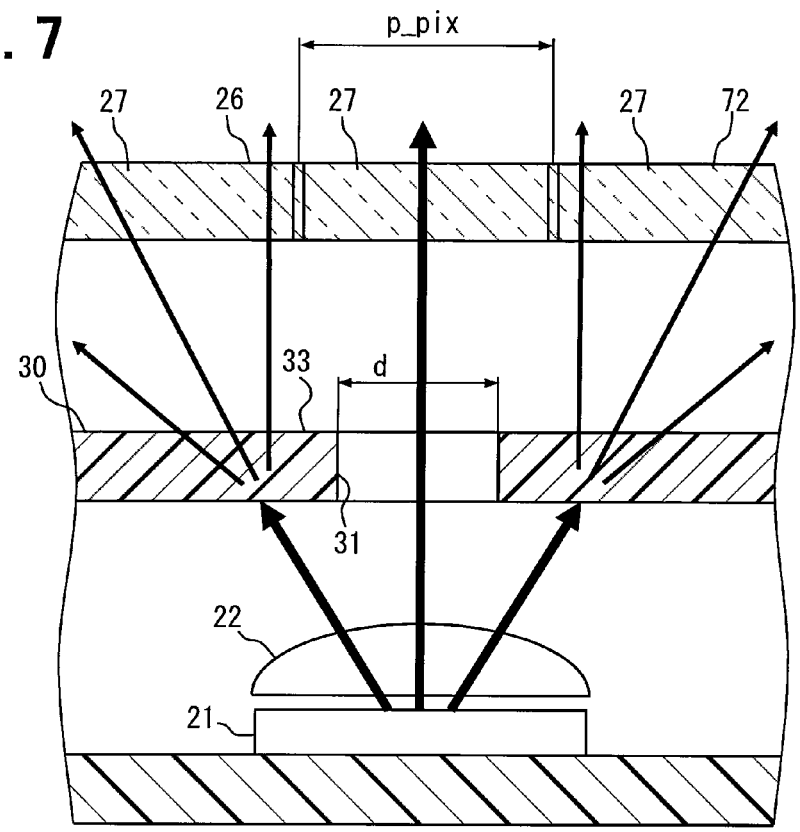
FIG. 7 is a diagram schematically illustrating a function of a diffusion plate.
Figure 8:
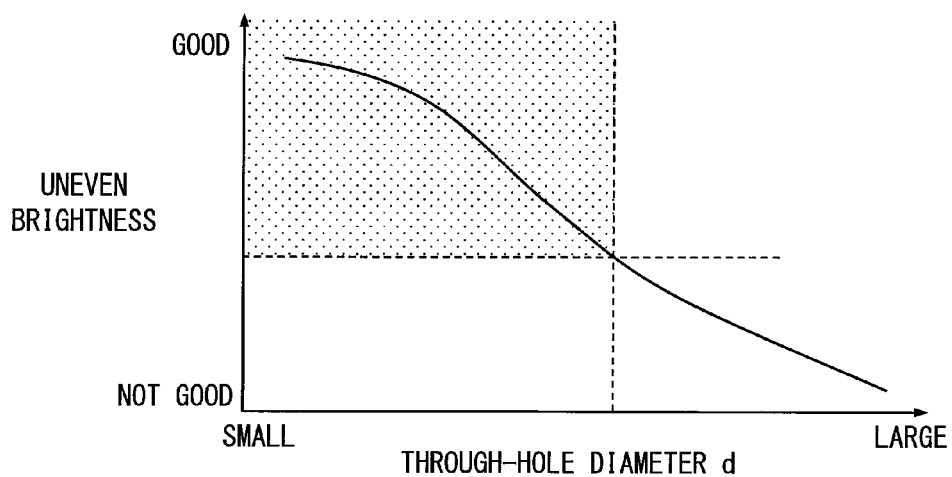
FIG. 8 is a diagram illustrating a correlation between an inside diameter of a through-hole and a brightness unevenness produced in a diffusion plate.

The virtual image 70 illustrated in FIG. 3 is formed by a collection of light spots, which are projected onto the projection surface 91 (see FIG. 2) after passing through the pixels 27 illustrated in FIG. 7. It may be preferable that these light spots be not individually and separately recognized by a user, and that the light spot on the virtual image 70 (refer to FIG. 3) be, for example, 0.5 mm or less.

A magnification ratio of the virtual image 70 to the display image 71 is six in the case of FIG. 1. In other words, the virtual image 70 is six times as large as the display image 71 in both the horizontal direction x and the perpendicular direction y. Thus, in order for each light spot forming the virtual image 70 to be 0.5 mm or less, the size of each pixel 27 in the horizontal direction x illustrated in FIG. 7, that is, the pixel pitch p_pix is less than or equal to 0.0083 . . . mm=0.5 mm divided by 6. In consideration of this pixel pitch p_pix, the inner dimension d of the through hole 31 may be preferably about 80 $\mu$m or less, more preferably 50 $\mu$m (corresponding to 0.3 mm in the magnified state) or less.

Herein, a brightness unevenness of the virtual image 70 in FIG. 3 is defined as a ratio of the brightness of the brightest portion of the virtual image 70 to the brightness of the darkest portion of the virtual image 70. As can be seen from the above, as the inner dimension d of the through hole 31 becomes smaller, a corresponding visible dot in the virtual image 70 becomes smaller and rarely individually perceived by a user when the light passing through the through hole 31 is magnified and produces the visible dot on the virtual image 70. This suppresses the brightness of the brightest portion and accordingly reduces the brightness unevenness. As show in FIG. 8, the brightness unevenness becomes smaller as the inner dimension d of the through-hole 31 becomes smaller. For these reasons, the through-hole 31 with the inner dimension d of 80 $\mu$m or less can reduce the brightness unevenness of the virtual image 70 (see FIG. 3), as shown in the dotted-region of FIG. 8.

Figure 9:
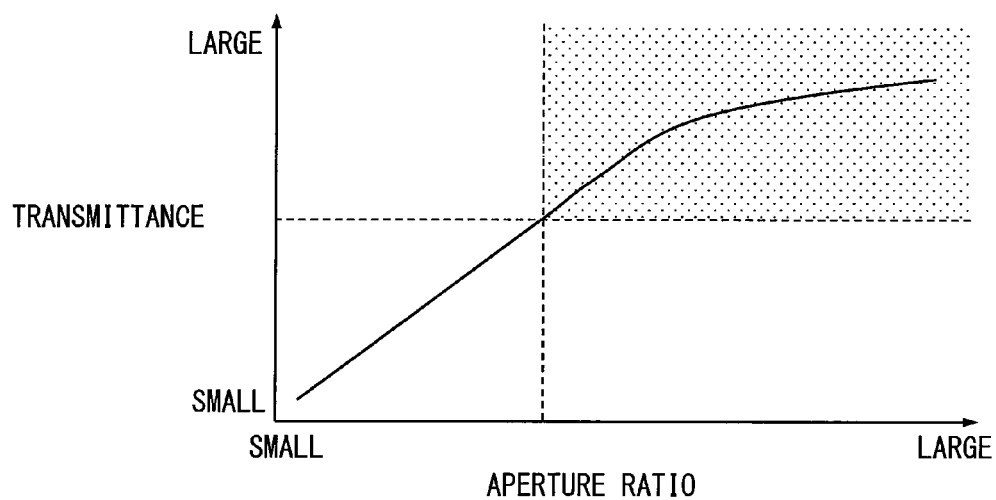
FIG. 9 is a diagram illustrating a correlation between an aperture ratio and a transmittance of a diffusion plate.

Furthermore, as shown in FIG. 9, the light transmittance of the diffusion plate 30 corresponds to an aperture ratio of the through-holes 31. Specifically, the light transmittance of the diffusion plate 30 improves as the inner dimension d of the through-hole 31 increases and as an interval between the adjacent through-holes 31 decreases. In the first embodiment, since the upper limit of the inner dimension d is specified as described above, a desired transmittance of the diffusion plate 30 can be attained by narrowing the interval of the through-holes 31 (see FIG. 9 for the dotted region).

In the above-described diffusion plate 30 of the first embodiment, the light emitted from the light source 21 passes through the through-hole 31. Thus, by increasing the density of the through-holes 31 in the diffusion plate 30, the light transmittance of the diffusion plate 30 can improve easily. Therefore, the HUD apparatus 100 can display the high-brightness virtual image 70 with low brightness-unevenness.

Moreover, in the first embodiment, because of the cylindrical hole shape of the through-hole 31, the light passing through the through-hole 31 can spread equally in outer radial directions of the through-hole 31. This further improves the diffusion property of the diffusion plate 30, and accordingly, further reduces the brightness-unevenness of the virtual image 70.

Moreover, in the first embodiment, the through holes 31 are arranged zigzag. This can increase the total number of through holes 31 in a given area. By increasing the transmittance of the diffusion plate 30 in this way, the brightness of the virtual image 70 further improves.

Moreover, in the diffusion plate 30 of the first embodiment, not only the through-hole 31 but the diffusion regions 33 surrounding the through-holes 31 pass (transmit) the light coming from the light source 21. Because the diffusion regions 33 contributes to the improvement in the light transmittance in this way, the diffusion plate 30 can further attain the high light transmittance. Therefore, the brightness of the virtual image 70 further improves.

In the first embodiment, the vehicle 1 corresponds to an example of movable body. The diameter d corresponds to an example of inner dimension. The horizontal direction x corresponds to an example of specific direction.

(Second Embodiment)

Figure 10:
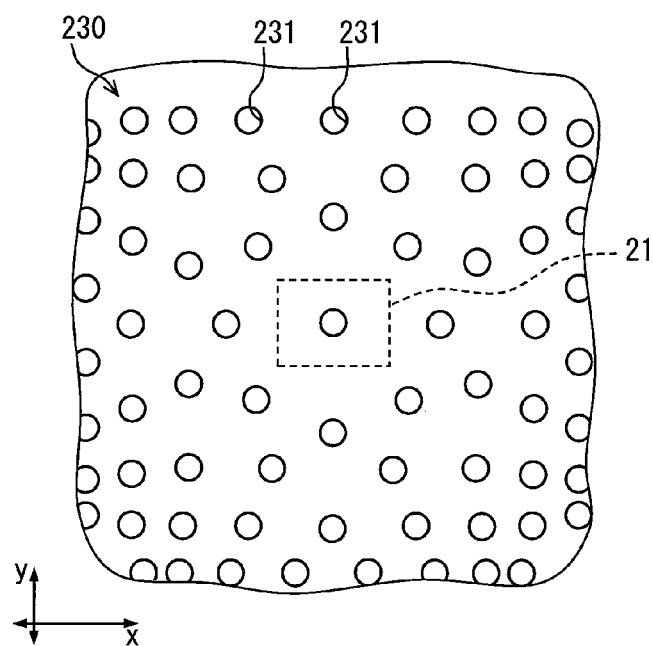
FIG. 10 is a diagram schematically illustrating through-holes formed in a diffusion plate of a second embodiment.

A second embodiment illustrated in FIG. 10 is a modification of the first embodiment. In the diffusion plate 230 of the second embodiment, the density of through-holes 231 increases with increasing distance from the light source 21. According to this arrangement of the through-holes 231, because the aperture ratio increases with increasing distance from the light source 21, the light transmittance becomes higher as the distance from the light source 21 increases. This reduces a difference between the brightness of light emitted from portions of the diffusion plate 230 close to the light source 230 and the brightness of light emitted from other portions of the diffusion plate 230 distant from the light source 230.

The second embodiment can achieve substantially the same advantages as the first embodiment, and can display the high-visual-quality virtual image 70 with high brightness (see FIG. 3). In addition, in the second embodiment, the light passing through the diffusion plate 230 can make uniform brightness regardless of the distance from the light source 21. Because the diffusion plate 230 attains the well light diffusion property in this way, the brightness unevenness of the virtual image 70 is further suppressed.

(Third Embodiment)

Figure 11:
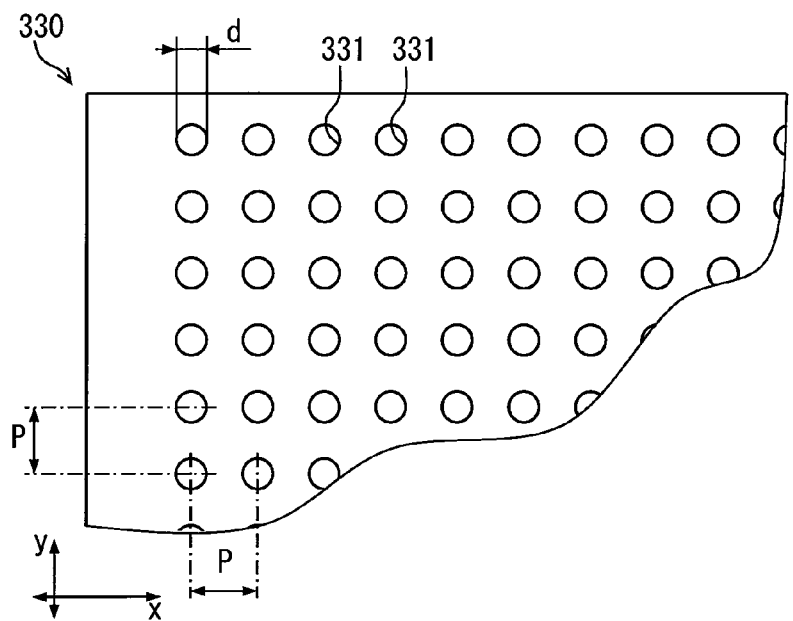
FIG. 11 is a diagram schematically illustrating through-holes formed in a diffusion plate of a third embodiment.

A third embodiment illustrated in FIG. 11 is another modification of the first embodiment. In a diffusion plate 330 of the third embodiment, multiple through-holes 331 are arranged at constant intervals in both the horizontal direction x and the perpendicular direction y. Specifically, a through-hole 331 adjacent to a certain through-hole 331 in the horizontal direction x is not displaced with respect to the certain through-hole 331 in the perpendicular direction y. In the third embodiment, intervals P between the adjacent through-holes 331 in the horizontal direction x and the perpendicular direction y are, for example, specified as about 0.15 mm.

When the multiple through-holes 331 of the diffusion plate 330 are arranged parallel as in the third embodiment, substantially the same advantages as in the first embodiment can be achieved because of the through hole 331 with the diameter d of 80 μm or less. Therefore, the high-visual-quality virtual image 70 with high brightness can be displayed (refer to FIG. 3).

(Fourth Embodiment)

Figure 12:
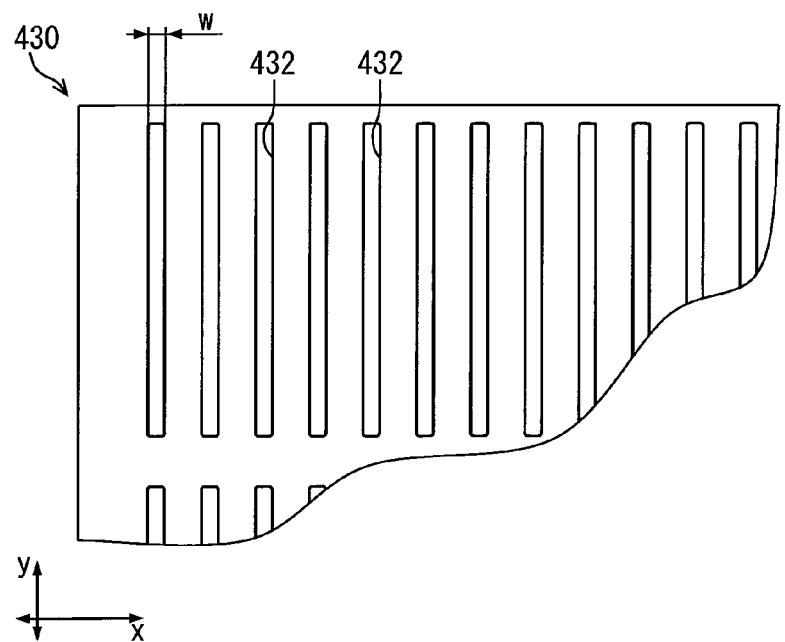
FIG. 12 is a diagram schematically illustrating through-holes formed in a diffusion plate of a fourth embodiment.

In the fourth embodiment illustrated in FIG. 12, multiple silts 432 having longitudinal directions in the perpendicular direction y are formed as through-holes in place of the cylindrical-hole-shaped through holes 31 (refer to FIG. 6) of the first embodiment. The multiple slits 432 are arranged at constant intervals in the horizontal direction x. The width w of each slit 432, which is an inner dimension of the slit 432, may be preferably 80 μm or less, more preferably 50 μm or less, as is the diameter d of the through hole 31.

Figure 2:
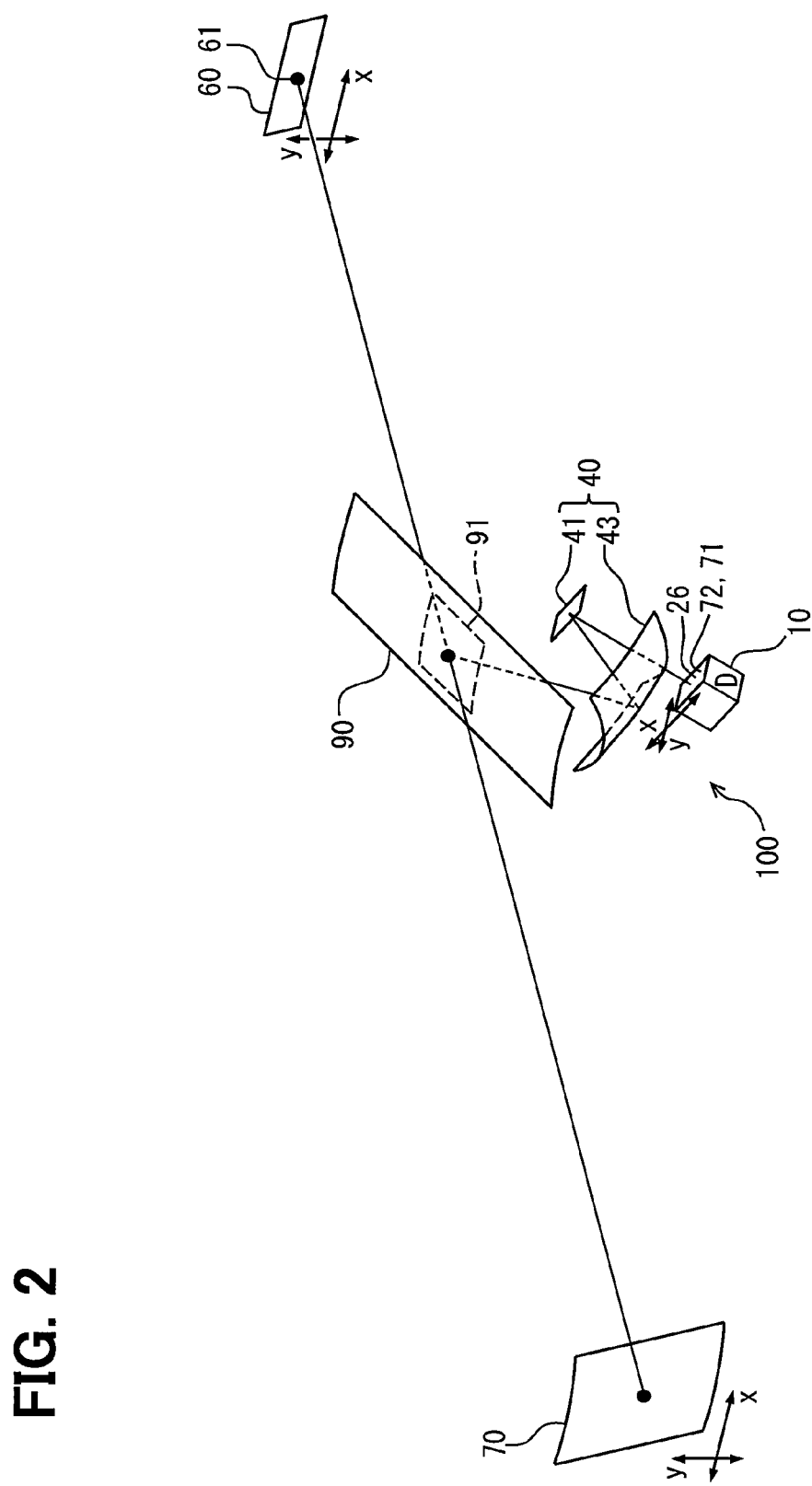
FIG. 2 is a diagram illustrating an arrangement of elements of a head-up display apparatus.

The light passing through the slits 432 produces lines of the light in the virtual image 70 (refer to FIG. 3) after the light is magnified by the magnifier optical system 40 (refer to FIG. 2) and the projection surface 91 (refer to FIG. 2). This line width of the light in the virtual image 70 is maintained at 0.5 mm or less. Therefore, the lines of the light produced in the virtual image 70 cannot be easily perceived by the user. In the third embodiment, the visual quality of the virtual image is not the degraded by the bright regions, which may be produced in the virtual image 70 by the light passing through the slits 432.

In addition, because the through-hole has a slit shape in the fourth embodiment, it becomes easily improve the aperture ratio of the diffusion plate 430 and consequently improve the light transmittance of the diffusion plate 430. Therefore, the brightness of the virtual image 70 (refer to FIG. 6) can further increase.

In the fourth embodiment, the slit 432 corresponds to an example of through hole. The width d of the slit 432 corresponds to an example of inner dimension.

(Fifth Embodiment)

Figure 13:
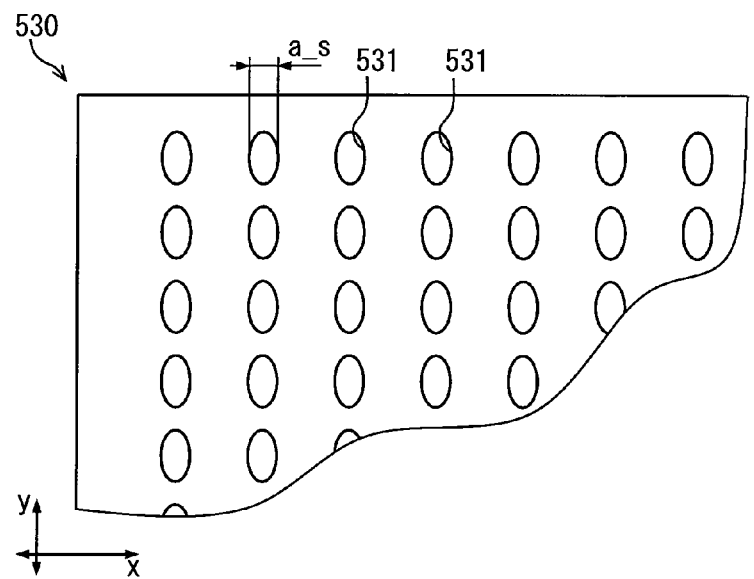
FIG. 13 is a diagram schematically illustrating through-holes formed in a diffusion plate of a fifth embodiment.

A fifth embodiment illustrated in FIG. 13 is a modification of the third embodiment. Multiple through-holes 531 formed in a diffusion plate 530 in the fifth embodiment have an elliptical tube shape. A longer axis of the elliptical shape of the through-holes 531 is parallel to the perpendicular direction y. A shorter axis of the elliptical shape of the through-holes 531 is parallel to the horizontal direction x.

This through-hole 531 can attain substantially the same advantages as in the first embodiment, when the length a_s of the shorter axis of the through-hole 531, which is the inner dimension of the through-hole 531, is set to 80 μm or less, preferably 50 μm or less. Therefore, the high-visual-quality virtual image 70 with high brightness can be displayed (refer to FIG. 3).

In the fifth embodiment, the length a_s of the shorter axis corresponds to an example of inner dimension.

(Sixth Embodiment)

Figure 14:
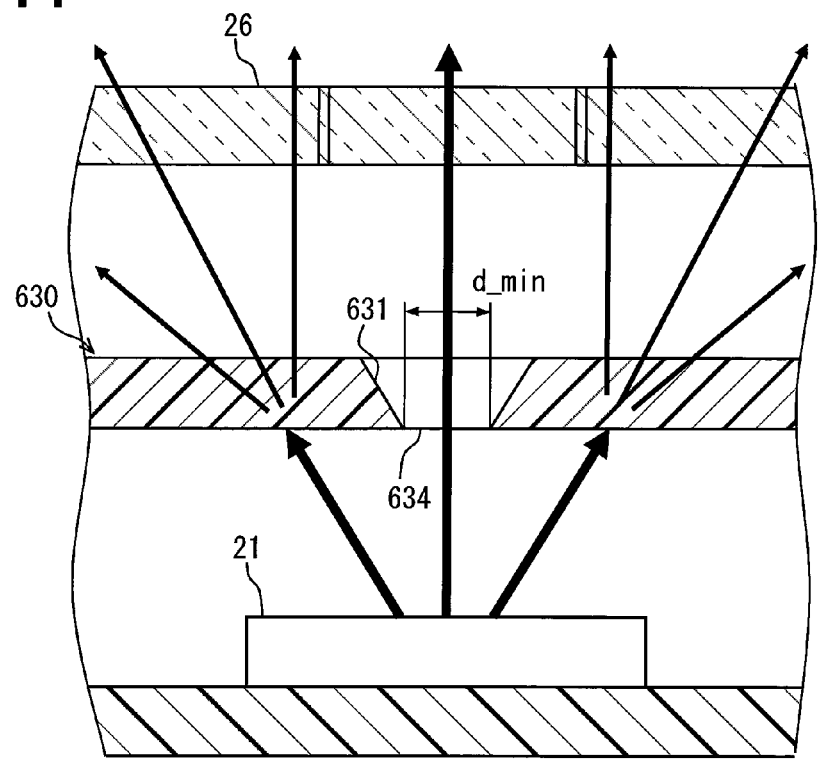
FIG. 14 is a diagram schematically illustrating through-holes formed in a diffusion plate of a sixth embodiment.

A sixth embodiment illustrated in FIG. 14 is a modification of the first embodiment. In the sixth embodiment, a diameter of a through-hole 631 of the diffusion plate 630 decreases with decreasing distance from the light source 21 along the thickness direction of the diffusion plate 630. In this tapered through-hole 631, the diameter d_min of the open end 634, which opens toward the light source 21, corresponds to an example of inner dimension of the through-hole 631. When the diameter d_min is set to 80 μm or less, preferably 50 μm or less, the high-visual-quality virtual image 70 with high brightness can be displayed (refer to FIG. 3).

In addition, in the sixth embodiment, because the diameter of the through-hole 631 increases along a direction from the light source 21 toward the display 26, the diffusion of the light passing through the through hole 631 is facilitated. By providing the diffusion plate 630 with the high light diffusion property in this way, it becomes possible to further suppress the brightness unevenness of the virtual image 70 (refer to FIG. 3).

(Other Embodiments)

Although multiple embodiments are illustrated above, embodiments of the present disclosure are not limited to the above-illustrated embodiments and include various embodiments and combinations.

In modifications of the above embodiments, the display may adopt a very small pixel pitch p_pix. In this case, the inner dimension of the through-hole may be larger than the pixel pitch p_pix. Even in this configuration, as long as the product of the inner dimension by the magnification ratio of the virtual image to the display image is 0.5 mm or less, the visual-quality degradation of the virtual image 70 due to the bright spots produced by the light passing through the through-holes 31 is avoided.

In modifications of the above embodiments, the specific direction is not limited to the horizontal direction x. The specific direction may be appropriately changed depending on the magnification ratio of the magnifier optical system and the projection surface, the opening shape of the through hole, or the like. In this regard, when there is a difference in the magnification ratio of the virtual image 70 to the display image 71 between the horizontal direction x and the perpendicular direction y, it may be preferable that the direction in which the magnification ratio is larger be set to the above-described specific direction. When a structure corresponding to the magnifier optical system 40 is omitted, the magnification ratio is determined by the shape of the curved projection surface 91. When the projection surface 91 is flat, the magnification ratio is determined by the magnification ratio of the magnifier optical system 40.

In modifications of the first embodiment, the angle a between the adjacent through-holes is not limited to 60 degrees and may be set to, for example, 90 degrees. In modifications of the third embodiment, the interval P between the through-holes in the horizontal direction x may be different from the interval P between the through-holes in the perpendicularly direction y. Additionally, the value of the interval P between the through holes is not limited to the above-described values and can be modified.

In modifications of the above embodiments, the cross sectional shape of the through hole in the diffusion plate may be polygonal such as tetragonal, trigonal, and the like. The axis direction of the through hole may be inclined with respect to the thickness direction of the diffusion plate. The inner dimensions and the cross sectional shapes of the through holes may vary depending on the position in the diffusion plate.

In modifications of the above embodiments, the diffusion plate may be made of a light-blocking material as long as a desired transmittance is ensured. The shape of the diffusion plate is not limited to a rectangular shape and may be modified according to shape etc. of the display. For example, the diffusion plate may be curved.

In the above embodiments, the HUD apparatus is mounted to the vehicle to project the display image 71 on the windshield 90. However a technical idea of the HUD apparatus is applicable to various head-up display apparatuses, which may be mounted to transportation apparatuses to make a virtual image 70 of the display image 71 viewable to a user.

Although embodiments and configurations according to the present disclosure have been illustrated, embodiments and configurations according to the present disclosure are not limited to the above-illustrated embodiments and configurations. Embodiments and configurations obtained by appropriately combining technical elements disclosed in different embodiments and configurations are also within scope of embodiments and configurations according to the present disclosure.

What is claimed is:

1. A head-up display apparatus that projects a display image, which is formed on a display surface, onto a projection surface of a movable body to display a virtual image viewable from an inside of a cabin of the movable body, the head-up display apparatus comprising:
   a display that includes a plurality of pixels arranged along the display surface and controls the pixels to form the display image on the display surface;
   a light source that radiates light; and
   a diffusion plate that diffuses the light coming from the light source and emits the diffused light toward the display;
   wherein:
   the diffusion plate is made of a transparent material and has a plurality of through-holes that penetrate the diffusion plate in a thickness direction of the diffusion plate; and
   in a specific direction on the display surface, a dimension of the through-hole is smaller than a pixel pitch of the pixels
   further comprising:
   a magnifier optical system that magnifiers the display image formed on the display surface and projects the magnified display image onto the projection surface,
   wherein:
   the dimension multiplied by a magnification ratio of the display image in the specific direction is less than or equal to 0.5 millimeters, the magnification ratio being provided by the magnifier optical system and the projection surface.

2. The head-up display apparatus according to claim 1, wherein:
   a cross sectional shape of the through-hole taken along directions perpendicular to the thickness direction is substantially circular.

3. The head-up display apparatus according to claim 1, wherein:
   the plurality of through-holes are arranged zigzag in the diffusion plate.

4. The head-up display apparatus according to claim 1, wherein:
   a density of the through-holes in the diffusion plate increases with increasing distance from the light source.

5. The head-up display apparatus according to claim 1, wherein depressions and protrusions for light diffusion are formed on a surface of the diffusion plate.

6. The head-up display apparatus according to claim 1, wherein the magnification ratio is larger than 1.

7. A head-up display apparatus that projects a display image, which is formed on a display surface, onto a projection surface of a movable body to display a virtual image viewable from an inside of a cabin of the movable body, the head-up display apparatus comprising:
   a display that forms the display image on the display surface;
   a light surface that radiates light; and
   a diffusion plate that diffuses the light coming from the light source and emits the diffused light toward the display; and a magnifier optical system that magnifies the display image formed on the display surface and projects the magnified display image onto the projection surface, wherein:

the diffusion plate is made of a transparent material and has a plurality of through-holes that penetrate the diffusion plate in a thickness direction of the diffusion plate; and a dimension of the through hole in a specific direction on the display surface multiplied by a magnification ratio of the display image in the specific direction is less than or equal to 0.5 millimeters, the magnification ratio being provided by the magnifier optical system and the projection surface.

8. The head-up display apparatus according to claim 7, wherein depressions and protrusions for light diffusion are formed on a surface of the diffusion plate.

9. The head-up display apparatus according to claim 7, wherein the magnification ratio is larger than 1.

* * * * *